(12) United States Patent
Jin et al.

(10) Patent No.: US 8,249,538 B2
(45) Date of Patent: Aug. 21, 2012

(54) OFFSET DIRECT CONVERSION RECEIVER

(75) Inventors: Hang Jin, Plano, TX (US); John Grabner, Plano, TX (US)

(73) Assignee: Cisco Technology, Inc., San Jose, CA (US)

(*) Notice: Subject to any disclaimer, the term of this patent is extended or adjusted under 35 U.S.C. 154(b) by 771 days.

(21) Appl. No.: 12/276,449

(22) Filed: Nov. 24, 2008

(65) Prior Publication Data
US 2010/0130156 A1     May 27, 2010

(51) Int. Cl.
H04B 1/10 (2006.01)
(52) U.S. Cl. .......................... 455/296; 345/169
(58) Field of Classification Search ............... 455/296; 345/169
See application file for complete search history.

(56) References Cited

U.S. PATENT DOCUMENTS

| | | | |
|---|---|---|---|
| 7,158,586 B2 * | 1/2007 | Husted | ............... 375/324 |
| 7,251,298 B1 | 7/2007 | Hietala et al. | |
| 2003/0219067 A1 | 11/2003 | Birkett et al. | |
| 2006/0079195 A1 | 4/2006 | Beamish et al. | |
| 2006/0083335 A1* | 4/2006 | Seendripu et al. | ............ 375/332 |
| 2006/0140315 A1 | 6/2006 | Kluge et al. | |
| 2007/0080835 A1 | 4/2007 | Maeda et al. | |
| 2007/0105519 A1 | 5/2007 | Perkins | |

FOREIGN PATENT DOCUMENTS
EP    1058396 A1    12/2000

OTHER PUBLICATIONS

Wayne Ni and Zhenbiao Li, "RF CMOS SoC Architectures and Building Blocks", Solid-State and Integrated Circuit Technology, 2006. ICSICT '06. 8th International Conference on, IEEE, PI, Oct. 23, 2006, pp. 1833-1836.
L. Mauer, K. Chabrak, R. Weigel "Design of Mobile Radio Transceiver RFICs: Current Status and Future Trends", Piscataway, New Jersey, Mar. 21, 2004, pp. 53-56.
PCT Search Report, PCT Application No. PCT/US2009/031252, Jul. 22, 2009.

* cited by examiner

*Primary Examiner* — Lincoln Donovan
*Assistant Examiner* — Shikha Goyal
(74) *Attorney, Agent, or Firm* — Edell, Shapiro & Finnan, LLC

(57) ABSTRACT

An offset direct conversion receiver apparatus and corresponding receiving method are provided. A received wireless signal is directly downconverted and demodulated to a baseband offset frequency that is offset from zero frequency to produce an in-phase (I) baseband offset signal centered at the baseband offset frequency and a quadrature-phase (Q) baseband offset signal centered at the baseband offset frequency. The I baseband offset signal and Q baseband offset signal are bandpass filtered to produce an I bandpass signal and a Q bandpass signal, respectively. The I bandpass signal and the Q bandpass signal are downconverted from the baseband offset frequency to zero frequency to produce an I baseband receive signal and a Q baseband receive signal. A technique and logic are also provided to select the best baseband offset frequency used in an offset direct conversion receiver.

28 Claims, 6 Drawing Sheets

FIG. 4A
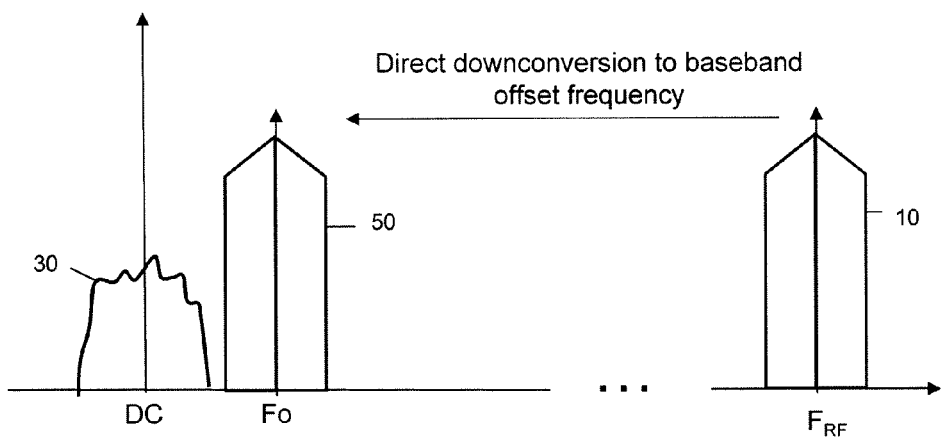
Direct downconversion to baseband offset frequency
FIG. 4B
FIG. 4C
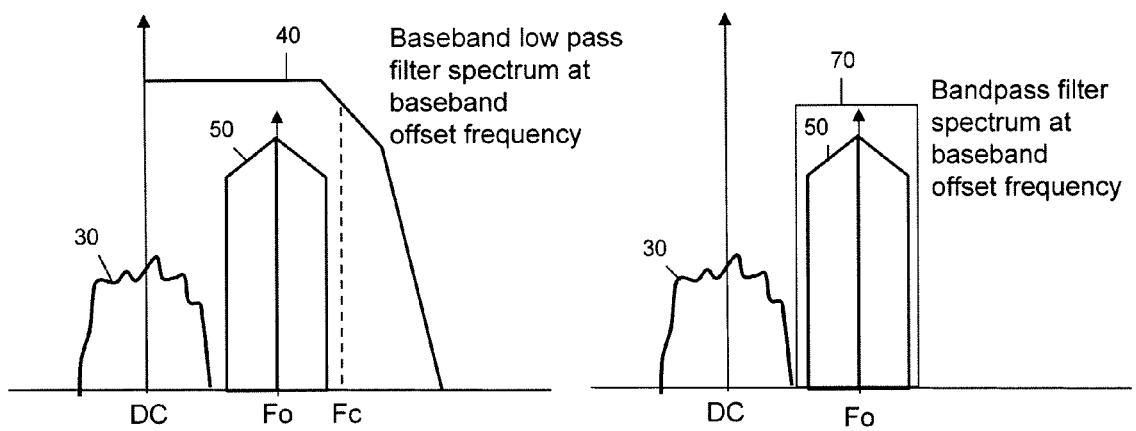
Baseband low pass filter spectrum at baseband offset frequency
Bandpass filter spectrum at baseband offset frequency
FIG. 4D
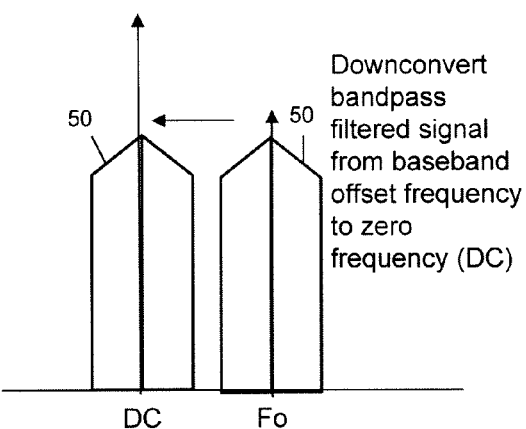
Downconvert bandpass filtered signal from baseband offset frequency to zero frequency (DC)

OFFSET DIRECT CONVERSION RECEIVER

TECHNICAL FIELD

The present disclosure relates to wireless communication devices, and more particularly to a receiver for a wireless communication device.

BACKGROUND

Wireless communication devices use receivers to convert received radio frequency (RF) energy into baseband signals, centered at zero frequency or "DC". Information carried in the baseband signals is then recovered using any of a variety of signal processing steps depending on the particular techniques used to modulate the information onto the baseband signal prior to its wireless transmission.

RF device designers are continually seeking ways to improve the performance of receivers in order to accurately recover the information carried in a received RF signal. For example, one type of receiver architecture, known as a "superheterodyne" receiver, downconverts received RF signals to baseband in two stages: first from RF to an intermediate frequency (IF), and then from IF to baseband. A superheterodyne receiver enjoys good rejection of interference but it is relatively complex to design, uses circuitry that occupies a substantial amount of area in an integrated circuit and consequently has a relatively high cost.

Another type of receiver architecture is one that directly downconverts received RF signals to baseband. This type of receiver is referred to as a "direct conversion" receiver. An advantage of a direct conversion receiver is that it is simpler to design and implement and occupies less area in an integrated circuit. A disadvantage of a direct conversion receiver is that it experiences interference called self-mixing interference or second order inter-modulation interference, also known as "IM2" interference. The spectrum associated with IM2 interference is caused by the spectrum of an interfering signal being captured and down-mixed, together with the spectrum of the desired signal, by the receiver. The spectrum of the IM2 interference is centered at DC and thus overlaps with the desired baseband signal that is also centered at DC. When the level of the IM2 interference is significant, the performance of the receiver is severely degraded, making it more difficult to recover information in the baseband signal.

BRIEF DESCRIPTION OF THE DRAWINGS

FIGS. 4A, 4B, 4C and 4D are plots depicting signals in the frequency domain during stages of the offset direct conversion receiving process.

DESCRIPTION OF EXAMPLE EMBODIMENTS

Overview

Described herein is an offset direct conversion receiver apparatus and corresponding method. A received wireless signal is directly downconverted and demodulated to a baseband offset frequency that is offset from zero frequency to produce an in-phase (I) baseband offset signal centered at the baseband offset frequency and a quadrature-phase (Q) baseband offset signal centered at the baseband offset frequency. The I baseband offset signal and Q baseband offset signal are bandpass filtered to produce an I bandpass signal and a Q bandpass signal, respectively. The I bandpass signal and the Q bandpass signal are downconverted from the baseband offset frequency to zero frequency to produce an I baseband receive signal and a Q baseband receive signal.

According to another aspect, a technique and logic are provided to select the best baseband offset frequency used in an offset direct conversion receiver. For each of a plurality of values for a baseband offset frequency, a radio receiver in a communication device is configured to downconvert a received radio frequency signal to the baseband offset frequency, and then to baseband after bandpass filtering at the baseband offset frequency to produce a baseband receive signal. The noise in the baseband receive signal is measured. A value is selected for the baseband offset frequency that results in lowest noise in the baseband receive signal.

Figure 1:
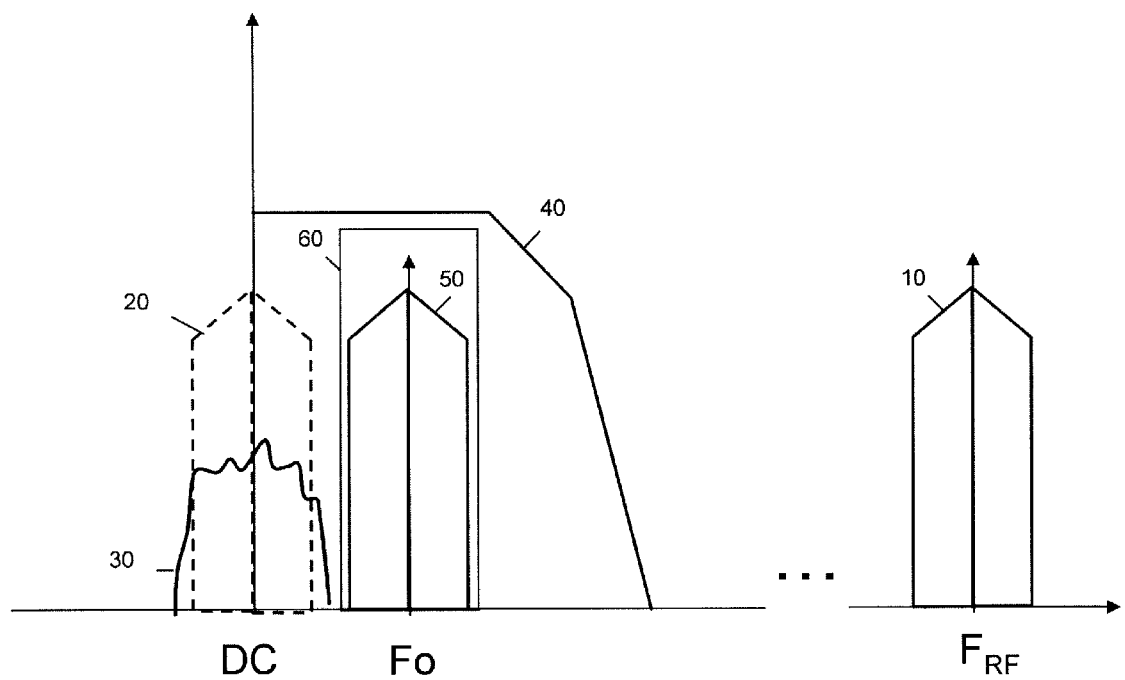
FIG. 1 is a plot depicting signals in the frequency domain and illustrating an offset direct conversion receiving process according to techniques described herein.

Referring first to FIG. 1, a frequency domain plot is shown of signals that are produced according to the offset direct conversion receiver techniques described herein as compared to a conventional direct conversion receiver process. The spectrum of a transmitted wireless radio frequency (RF) signal is shown at reference numeral 10, where the spectrum 10 is centered about a particular frequency called $F_{RF}$. When a conventional direct conversion receiver receives a signal having the spectrum 10, it downconverts that signal directly to zero frequency, also known as "DC", and the spectrum for this downconverted baseband signal centered around DC is shown at reference numeral 20.

The pass band for a baseband low pass filter is shown at reference numeral 40. The downconverted baseband signal is filtered using the baseband low pass filter in order to filter out any interference, such as image interference that may exist outside of the pass band 40 of the low pass filter as a result of the downconversion process.

The analog components that are used to downconvert the RF spectrum 10 directly to baseband inherently generate interference called self-mixing interference or second order inter-modulation interference, also known as "IM2" interference. The spectrum associated with this IM2 interference is shown at reference numeral 30 and results when the spectrum of an interfering signal is captured and down-mixed, together with the spectrum of the desired signal, by the receiver. FIG. 1 shows that the spectrum 30 of IM2 interference generally always falls around DC. The spectrum 30 associated with the IM2 interference is also within the pass band 40 of the low pass filter. When the strength of the IM2 interference is strong, the performance of the receiver and downstream signal processing of the received signal is severely degraded.

Accordingly, techniques are provided herein to directly downconvert the received wireless signal to a frequency that is offset from DC. This frequency is referred to herein as a baseband offset frequency (Fo). When the spectrum 10 associated with the received wireless signal is downconverted to the baseband offset frequency Fo, a baseband offset signal is produced having a spectrum such as that shown at reference numeral 50. The spectrum 20 associated with the IM2 interference does not overlap with the spectrum 50 of the baseband offset signal. Consequently, a bandpass filter having a spectrum such as that shown at 60 and centered at the baseband offset frequency Fo can be applied to the baseband offset signal to filter out the IM2 interference. The resulting filtered spectrum, which contains only the baseband offset signal, can then be downconverted from the baseband offset frequency Fo to DC.

Figure 2:
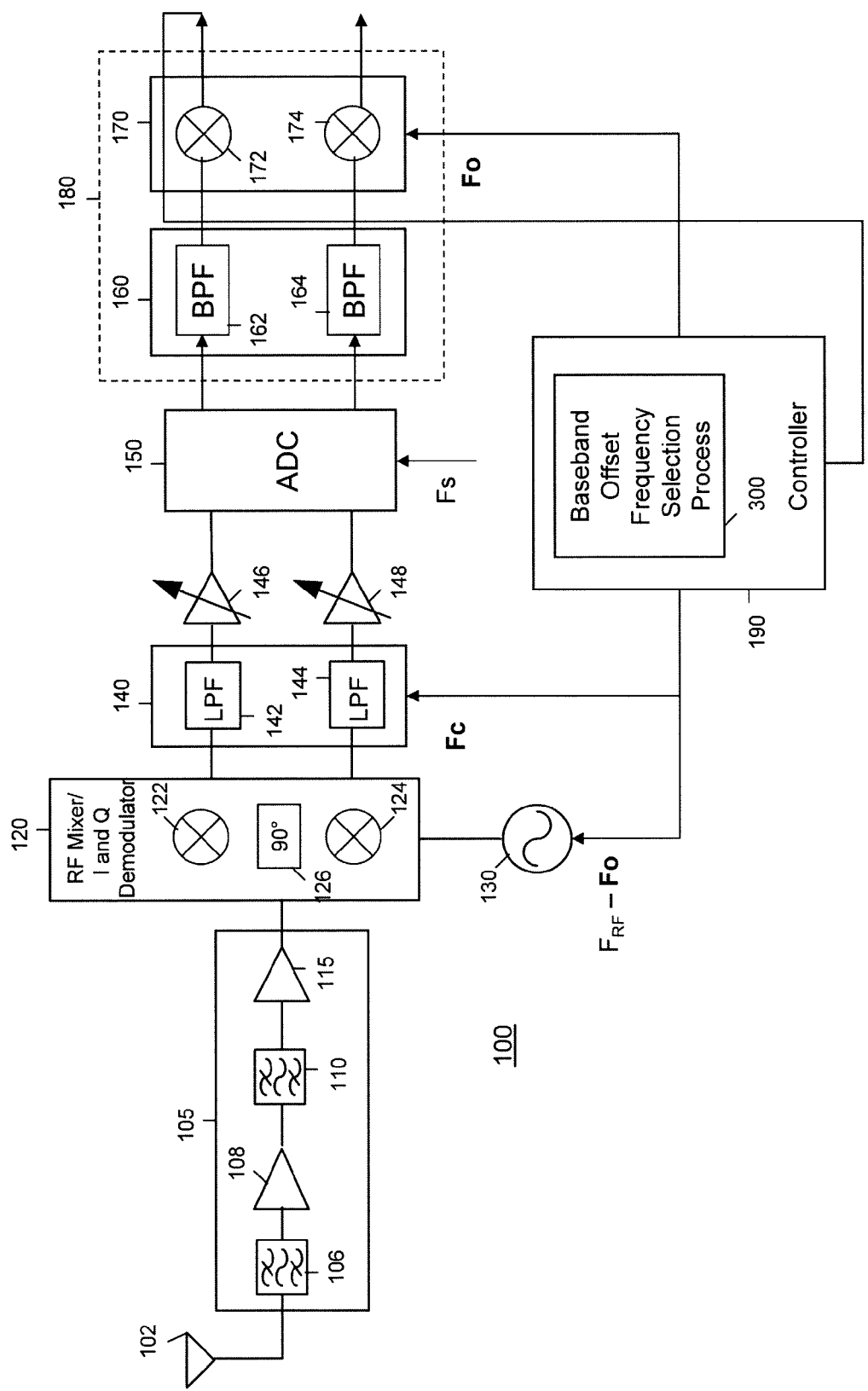
FIG. 2 is an example of a block diagram of an offset direct conversion receiver.

Turning now to FIG. 2, a block diagram for an offset direct conversion receiver apparatus is now described. The offset direct conversion receiver apparatus is shown generally at reference numeral 100. The receiver apparatus 100 comprises an antenna 102 connected to an RF front-end 105. The RF front-end 105 is connected to an RF mixer 120 that is driven by a local oscillator 130. The RF mixer 120 is in turn connected to a baseband low pass filter block 140. The baseband low pass filter block 140 is in turn coupled to an analog-to-digital converter (ADC) 150. The ADC 150 is connected to a digital bandpass filter block 160 that in turn is connected to a digital baseband mixer block 170. The digital bandpass filter block 160 and the digital baseband mixer block 170 may be embodied in different signal processing elements or in a common digital signal processing element such as that shown at reference numeral 180.

A controller 190 is provided that is coupled to the local oscillator 130, the baseband low pass filter block 140, the bandpass filter block 160 and the baseband mixer block 170. In addition, the controller 190 is connected to the output of the baseband mixer block 170 in order to capture and analyze the baseband receive signal(s) for purposes described hereinafter. The controller 190 is, for example, a microprocessor, microcontroller, digital signal processor, etc., and executes various control processes for the receiver 100. One such control process is a baseband offset frequency selection process shown at reference numeral 300. The process 300 may be implemented with logic in the form of software that is embodied as instructions stored or encoded in a processor readable medium (e.g., memory) that is part of (or separate from) the controller 190. Other forms for implementing the logic for process 300 are digital signal processing techniques on a digital signal processor chip, firmware techniques, either with fixed digital logic gates in an application specific integrated circuits (ASICs) or programmable digital logic gates in field programmable gate array (FPGA) devices, or with software executed by a microprocessor or microcontroller. In general, the process 300 may be implemented by logic encoded in one or more tangible media, such that when executed, the functions of process 300, described herein, are performed.

The receiver apparatus 100 is now described in greater detail. The RF front-end 105 receives as input an RF wireless signal detected by the antenna 102. There are numerous possible configurations for the components in the RF front-end 105. For example, a first RF filter 106 is provided followed by a low noise amplifier 108. A second RF filter 108 is then provided that is followed by an RF amplifier 115. The output of the RF front-end 105 is a pre-filtered and amplified RF signal that represents the RF wireless signal detected by the antenna 102.

The RF mixer 120 receives as input the pre-filtered and amplified RF signal from the RF front-end 105. The RF mixer 120 also receives as input from the local oscillator 130 a local oscillator signal that is at a frequency of $F_{RF}$-Fo. Consequently, the RF mixer 120 directly downconverts the RF signal from an RF frequency $F_{RF}$ to a baseband offset frequency Fo. Again, the baseband offset frequency Fo is offset by some predetermined amount from zero frequency or DC.

In one embodiment, the RF mixer 120 is configured to serve as an in-phase (I) and quadrature-phase (Q) demodulator so as to output I and Q signals in the course of directly downconverting (downmixing) the RF signal supplied by the RF front-end 105. To this end, the RF mixer 120 comprises a first mixer 122, a second mixer 124 and a 90° phase-shifter 126. One of the first and second mixers 122 and 124, such as mixer 122, receives the local oscillator signal supplied by the local oscillator 130 and the RF signal and outputs an I baseband offset signal centered at the baseband offset signal Fo. The local oscillator signal is also supplied to the 90° phase-shifter 126 that drives the other mixer, e.g., mixer 124, with a 90° phase-shifted version of the local oscillator signal. The mixer 124 also receives the RF signal and outputs a Q baseband offset signal centered at the baseband offset signal Fo.

While FIG. 2 shows a receiver architecture that employs I and Q signals, it should be understood that this is only an example. The concepts of the offset direct conversion receiver may be practiced without the use of I and Q signals. The description of FIG. 2 continues herein on the basis that an I and Q architecture is employed. One advantage of directly downconverting the RF spectrum to separate baseband I and Q signals is that the image signal will not "fold" into the desired baseband signal. The spectrum associated with the image signal, along with the IM2 interference, will be filtered out by the bandpass filter block 160.

The baseband low pass filter block 140 performs low pass filtering of the baseband offset signal, and has a corner frequency Fc such that a resulting a pass band encompasses the entire spectrum of the baseband offset signal. Furthermore, the corner frequency Fc is configurable/programmable by the controller 190 as described hereinafter. The baseband low pass filter block 140 comprises a first baseband low pass filter 142 for the I baseband offset signal and a second baseband low pass filter 144 for the Q baseband offset signal. The first baseband low pass filter 142 low pass filters the I baseband offset signal and the second baseband low pass filter 144 low pass filters the Q baseband offset signal. Again, the corner frequencies of the filters 142 and 144 are configured such that their resulting pass bands encompass the entire spectrum of the I and Q baseband offset signals, respectively.

Variable gain amplifiers (VGAs) 146 and 148 are provided at the output of the baseband low pass filter block 140 to amplify the low pass filtered I and Q baseband offset signals prior to conversion to digital signals. Thus, at this point in the example receiver architecture shown in FIG. 2, the signals are still analog signals. The ADC 150 converts the analog low pass filtered I and Q baseband offset signals to digital low pass filtered I and Q baseband offset signals for further processing. The sampling frequency Fs of the ADC 150 is set to a frequency high enough to accommodate the bandwidth of the I and Q baseband offset signals up to the baseband offset frequency Fo. For example, when the bandwidth (BW) of the I and Q baseband offset signals is 10 MHz, then the sampling frequency Fs is greater than 2*(Fo+BW/2), or 44.8 Mbps.

The digital I and Q baseband offset signals output by the ADC 150 are coupled to the bandpass filter block 160. The bandpass filter block 160 is a digital component or function and comprises a first bandpass filter 162 and a second bandpass filter 164. The first bandpass filter 162 is centered at the baseband offset frequency Fo and has a pass band that encompasses the bandwidth of the digital (low pass filtered) I baseband offset signal. Likewise, the second bandpass filter 164 is centered at the baseband offset frequency Fo and has a pass band that encompasses the bandwidth of the digital (low pass filtered Q baseband offset signal (which is the same as the bandwidth of the digital low pass filtered I baseband offset signal). Thus, the bandpass filter block 160 outputs bandpass filtered I and Q baseband offset signals. The bandpass filter block 160 performs the filtering that eliminates the IM2 interference from the baseband receive signal. Again, because the baseband offset signals are not at baseband, but instead are centered at the baseband offset frequency Fo, the bandpass filtering, being centered at the baseband offset frequency Fo as well, captures the entire spectrum of the baseband offset signals but rejects the IM2 interference that is centered around zero frequency or DC (as shown in FIG. 1).

The baseband mixer 170 downconverts (down-mixes) the bandpass filtered baseband offset signal from the baseband offset frequency Fo to zero frequency or DC. The baseband mixer 170 comprises a first baseband mixer 172 and a second baseband mixer 174. The first baseband mixer 172 is configured to downconvert the I bandpass filtered baseband offset signal to DC to produce an I baseband receive signal and the baseband mixer 174 is configured to downconvert the Q bandpass filtered baseband offset signal to DC to produce a Q baseband receive signal. The I and Q baseband receive signals represent the desired baseband receive signal.

In an architecture that does not use I and Q signals, the baseband low pass filter block 140 would comprise a single baseband low pass filter that low pass filters the baseband offset signal. Similarly, the bandpass filter block 160 would comprise a single bandpass filter (centered at the baseband offset frequency Fo and having a pass band that encompasses the bandwidth of the baseband offset signal) that filters the (low pass filtered) baseband offset signal to produce a bandpass signal. Finally, the baseband mixer block 170 would comprise a single baseband mixer that downconverts the bandpass signal to zero frequency thereby producing a (single) baseband receive signal.

In one configuration of the receiver apparatus 100, the corner frequency Fc of the baseband low pass filter block 140 and the baseband offset frequency Fo are set to fixed values. In another configuration of the receiver apparatus 100, the corner frequency Fc and the baseband offset frequency Fo are dynamically adjusted during operation of the receiver apparatus 100 within a communication device operating in the field. The dynamic adjustment of the corner frequency Fc and the baseband offset frequency Fo is described hereinafter with reference to FIGS. 5 and 6 in connection with a description of the baseband offset frequency selection process 300.

FIG. 2 illustrates an example of a design of the receiver apparatus 100 in which analog signals are converted to digital signals by the ADC 150 after the baseband filter block 140. This is only an example. The ADC block 150 is optional and an analog implementation may be employed where the bandpass filter block 160 and the baseband mixer block 170 are implemented with analog circuits like the RF front-end block 105, RF mixer 120, local oscillator 130 and baseband low pass filter block 140. Conversely, a more fully digital implementation of the receiver apparatus 100 may be employed where except for a few components in the RF front-end block 105, all of the components in the receiver apparatus 100 are implemented with digital signal processing techniques, either with fixed digital logic gates in an ASICs or programmable digital logic gates in an FPGA device, or with software executed by a microprocessor or microcontroller.

Figure 3:
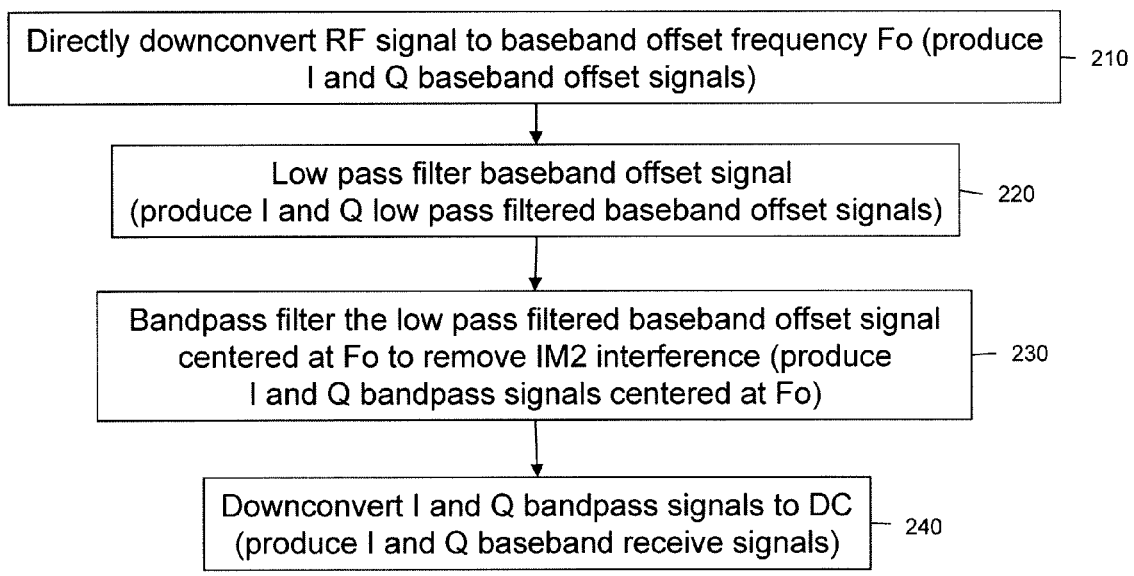
FIG. 3 is an example of a flow chart for an offset direct conversion receiving process.

Turning now to FIG. 3 in conjunction with FIGS. 4A-4D, an offset direct conversion receiving process is now described. The offset direct conversion receiving process shown at 200 in FIG. 3 reflects, at a high level, operation of the offset direct conversion receiver 100 shown in FIG. 2. For simplicity, it is understood that the spectra shown in FIGS. 4A-4D are for either an I or Q signal, for simplicity. At 210, the received wireless signal at an RF frequency $F_{RF}$ is directly downconverted to a baseband offset frequency Fo to produce I and Q baseband offset signals centered at the baseband offset frequency. FIG. 4A illustrates the function at 210 where the spectrum 10 of the received wireless signal at an RF frequency $F_{RF}$ is directly downconverted to the baseband offset frequency Fo. The spectrum of the resulting baseband offset signal is shown at reference numeral 50. Again, the spectrum of the IM2 interference is centered around DC as shown at reference numeral 30 in FIG. 4A.

At 220, the baseband offset signal is low pass filtered to produce I and Q low pass filtered baseband offset signals. FIG. 4B shows the pass band 40 of a baseband low pass filter. The corner frequency Fc of the baseband low pass filter block is configured such that the pass band encompasses the bandwidth of the baseband offset signal. It is noted that the spectrum of the IM2 interference is within the pass band of the low pass filter.

At 230, the low pass filtered I and Q baseband offset signals are filtered with a bandpass filter having a pass band centered at the baseband offset frequency Fo. The bandpass filtering function 230 removes the IM2 interference and thereby produces I and Q bandpass signals, respectively. FIG. 4C shows the pass band 70 of the bandpass filter centered at the baseband offset frequency Fo. Since the pass band 70 encompasses only the spectrum 50 of the low pass filtered baseband offset signal, the IM2 interference whose spectrum is centered around DC is rejected by the bandpass filtering process.

At 240, the I and Q bandpass signals are downconverted from the baseband offset frequency Fo to DC, thereby producing I and Q baseband receive signals. FIG. 4D shows that the baseband downconversion function at 240 shifts the spectrum 50 from the baseband offset frequency Fo to DC.

Figure 5:
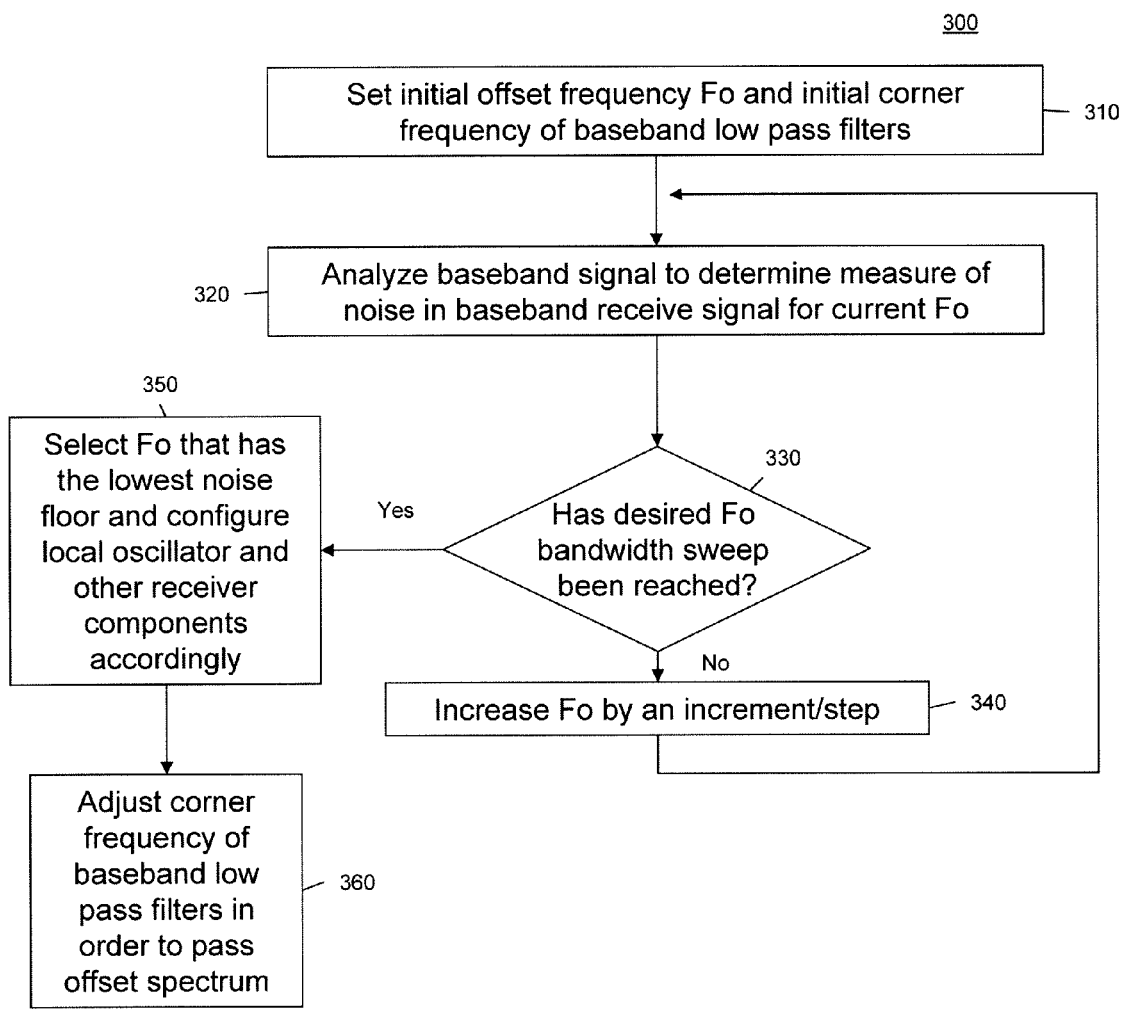
FIG. 5 is an example of a flow chart depicting a method for selecting the best baseband offset frequency for use in the offset direct conversion receiver.
Figure 6:
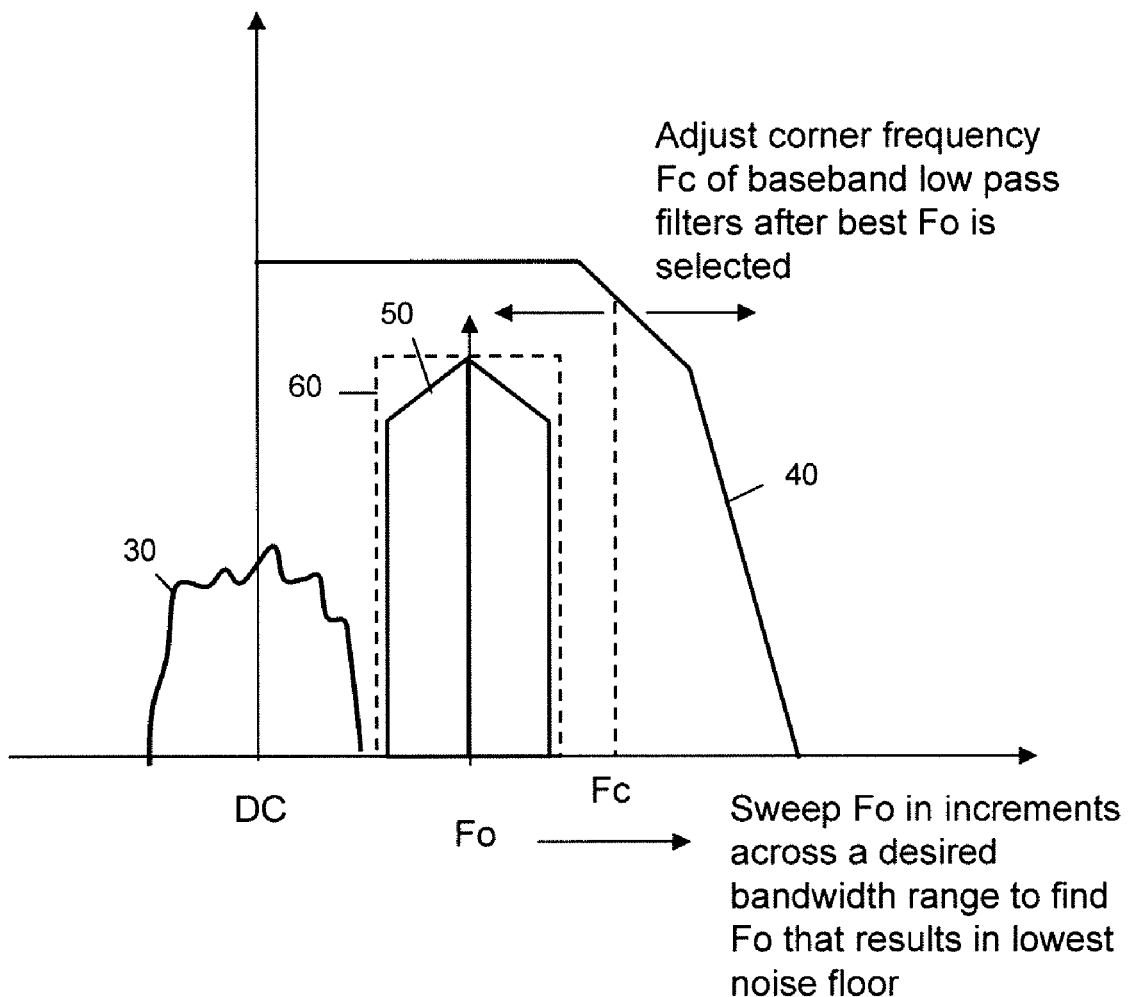
FIG. 6 is a plot depicting signals in the frequency domain in connection with the method for selecting the best baseband offset frequency.

Turning now to FIGS. 5 and 6, the baseband offset frequency selection process 300 is now described. Reference is also made to FIG. 2 for purposes of this description. The process 300 is performed within a communication device in which the receiver apparatus 100 resides from time to time during operation of the communication device in its normal operating environment, i.e., in the field. The process 300 may be invoked on a periodic basis, on-demand basis, or when a received signal-to-noise ratio (SNR) or other receive signal parameters drop below an acceptable threshold. Thus, a communication device equipped with the receiver apparatus 100 can dynamically adapt to changes in the operating environment.

At 310, an initial value for the baseband offset frequency Fo is set and also an initial value for the corner frequency Fc of the baseband low pass filter(s) is set. The initial value for the baseband offset frequency Fo is used to compute the frequency ($F_{RF}$-Fo) for the local oscillator signal produced by the local oscillator 130. That is, the controller 30 generates a value for the frequency of the local oscillator signal that the local oscillator 130 generates based on the baseband offset frequency Fo. The initial value for the baseband offset frequency Fo is also supplied to the bandpass filter block 160 for use in centering the pass band of the bandpass filter(s) and to the baseband mixer block 170 to set the oscillator signal used by the baseband mixer(s). The initial value for the corner frequency Fc is supplied to the baseband low pass filter block 140 to configure the corner frequency location of the baseband low pass filter(s).

At 320, baseband receive signal(s) output by the baseband mixer block 170 are captured and analyzed to compute a measure of the noise (e.g., noise floor) associated with the spectrum of the baseband receive signal(s) for the current value of the baseband offset frequency Fo. At the first pass through the value of the baseband offset frequency Fo is the initial value. There are many techniques for computing the noise floor of a receive signal. One such technique is to integrate the received power in empty blocks (in frequency and time) of a transmission frame structure received by the communication device in which the receiver apparatus 100 is incorporated. These "empty-blocks" may be slots which are not assigned to a device for transmission or in which no transmissions are being made by a device. Since these blocks will be "empty", any energy that is received in them is considered to be noise and/or interference. Another technique is to observe how the symbols of desired received signals are distributed on a symbol constellation plane, and to compute a symbol error vector magnitude (EVM). The EVM may be used to represent the noise and interference in the received signal.

At 330, a determination is made whether the baseband offset frequency Fo has been swept entirely through a desired bandwidth. If not, then the process proceeds to 340 where the value of the baseband offset frequency Fo is increased by an incremental or step value, and the process repeats from 320 to measure the noise in the baseband receive signal at the next value for the baseband offset frequency.

When the desired bandwidth or frequency range of the baseband offset frequency Fo has been swept, then at 350, the baseband offset frequency value that results in the lowest noise is selected. That is, one of the plurality of values for the baseband offset frequency that produces lowest noise in the baseband receive signal is selected. The controller 190 then computes the frequency of the local oscillator signal to be generated by the local oscillator 130 using the selected (best) value for Fo, i.e., $F_{RF}$-FO, and also supplies the selected value for Fo to the bandpass filter block 160 and to the baseband mixer block 170. The bandpass filter block 160 uses the selected baseband offset frequency value to configure the center frequency of the bandpass filtering applied to the low pass filtered baseband offset signal. The baseband mixer block 170 uses the selected baseband offset frequency value to appropriately downconvert the bandpass filtered baseband offset signal to zero frequency.

While the flow chart shown in FIG. 5 indicates that the baseband offset frequency is incremented upwards from an initial value, it may be decremented downward from an initial maximum value.

At 360, after the baseband offset frequency value that achieves the lowest noise floor is determined at 350, the corner frequency of the baseband low pass filter block 140 is determined to ensure that the spectrum of the baseband offset signal, given the selected value of the baseband offset frequency, is within the pass band of the low pass filter(s). For example, depending on the bandwidth of the baseband offset signal, it is possible that the selected value for the baseband offset frequency may be such that some portion of the spectrum of the baseband offset signal is outside the baseband low pass filter block 140 as previously or originally configured. In this case, the corner frequency of the baseband low pass filter block 140 is increased in order to pass the entire spectrum of the baseband offset signal.

Dynamically changing the offset frequency in order to select the best offset frequency that results in the lowest in-band noise has significant advantages. There are two competing factors that affect the in-band noise.

The first factor is that IM2 interference is often almost twice the bandwidth of the desired baseband receive signal. As a result, the baseband offset frequency needs to be large enough so that the desired baseband signal is completely outside the IM2 spectrum. For example, if there is an interfering spectrum having a 5 MHz bandwidth, and this interfering signal is captured by the receiver and down-mixed, the IM2 interference centered around DC will be approximately 10 MHz wide (−5 MHz to +5 MHz). (The IM2 interference is proportional to the convolution of the interfering signal). Consequently, the baseband offset frequency should be at least 5 MHz to completely avoid the IM2 interference. Generally speaking, a larger baseband offset frequency better eliminates the effects of IM2 interference.

The second factor is the in-band noise that is coupled to the baseband low pass filter. For example, if there is an interferer 5 MHz away from the center of the spectrum (5 MHz wide) of a desired signal, the baseband offset frequency is set to 7.5 MHz. The corner frequency of the baseband low pass filter may consequently be set to 10 MHz, resulting in a 20 MHz pass band (−10 MHz to 10 MHz). The interference at 5 MHz away is now in the pass band of the baseband low pass filter and will be coupled to the ADC with little suppression. If the interference level is not very high, the ADC may have enough head room to accommodate it. However, if the interference level is very high, it may saturate the ADC.

Thus, when selecting the value for the baseband offset frequency, it is necessary to account for two competing goals: (1) reject the IM2 interference by setting the baseband offset frequency Fo; and (2) reject in-band interference by keeping the pass band of the baseband low pass filter as tight as possible (using a lower value for the corner frequency Fc). One choice may be to select a large baseband offset frequency if IM2 interference is the dominating interference and another choice would be to select a small baseband offset frequency if in-band interference dominates.

When a communication device is deployed for use in a wireless communication network, these competing interference factors are dependent on service provider, geographical location and time. Generally, it is not possible to know in advance, during manufacture of a communication device, what the dominant interference is for a particular market, even if an RF survey is taken because the communication channel conditions change over time. Consequently, the capability to dynamically change the baseband offset frequency according to the actual operating environment is tremendously useful. In one example, the baseband offset frequency is incrementally changed with a step of 250 kHz across a bandwidth or frequency range of 30 MHz, for example. At each baseband offset frequency value, the noise in the baseband receive signal is measured and the baseband offset frequency exhibiting the lowest in-band noise is selected. Again, the process 300 may be performed on a regular, variable or on-demand basis to adjust to the changing operating environment. In one example, a base station or a management server may send a command, via a base station, to a communication device commanding it to execute the process 300 and thereby update the baseband offset frequency (and the corner frequency of the baseband low pass filter(s)).

The following are two examples of the utility of the dynamic baseband offset frequency selection process.

Example 1

A wireless network operator A has 15 MHz of spectrum in a 3.5 GHz frequency band. Wireless network operator B operates in the adjacent 10 MHz spectrum. Operator B operates a legacy system that uses frequency division duplex (FDD) technology and uses the 10 MHz adjacent spectrum for FDD downlink communications to mobile devices. Consequently, in this example, there is strong interference 10 MHz away from operator A's spectrum. In this case, the best way to reject this interference is to set the baseband offset frequency to zero in the receivers of the communication devices operating in the operator A's wireless network in order to maximize the rejection of interference associated with operator B's network achieved by the baseband low pass filter(s) in the communication devices. When a communication device operating in operator A's wireless network executes the process 300, it will select zero for the baseband offset frequency value because a zero baseband offset frequency will yield the lowest in-band noise.

Example 2

In the United States, the 2.5 GHz multichannel multipoint distribution service (MMDS) band has been allocated to WiMAX™ systems. In this case, the dominant interferences are from 2.4 GHz WiFi™ networks and 2.7 GHz radar systems and devices. There is approximately 40 MHz separation between the operation frequency of a WiMAX system and these interfering systems. However, the interfering systems produce very strong interfering signals. The best way to minimize the effects of these interfering systems is to use a relatively large baseband offset frequency so that the IM2 interference will be outside the spectrum of the desired signal in WiMAX mobile stations. A WiMAX mobile station that comprises a offset baseband receiver with dynamic offset capability (as described herein) can be configured to sweep a bandwidth using different baseband offset frequency values in order to determine the proper, and relatively large, baseband offset frequency value that will yield the lowest in-band noise.

A communication device that dynamically selects and adjusts its baseband offset frequency can handle operating systems according to both of the examples described herein, and in so doing, will select the best baseband offset frequency for the environment in which it is deployed and operating. Service providers that deploy communication devices with an offset direct conversion received as described herein, and particularly one configured to dynamically change the baseband offset frequency, can significantly eliminate the effects of interference that can degrade system performance.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
    receiving a wireless signal;
    selecting an initial value of a baseband offset frequency;
    measuring an initial noise level of downconversion of the received wireless signal to the initial value of the baseband offset frequency;
    incrementing the initial value for the baseband offset frequency to select a new value of the baseband offset frequency;
    measuring a new noise level of downconversion of the received wireless signal to the new value of the baseband offset frequency;
    selecting the initial value of the baseband offset frequency as a selected baseband offset frequency value if the initial noise level is lower than the new noise level;
    selecting the new value of the baseband offset frequency as the selected baseband offset frequency if the new noise level is lower than the initial noise level;
    directly downconverting and demodulating the received wireless signal to the selected baseband offset frequency value that is offset from zero frequency to produce an in-phase (I) baseband offset signal centered at the baseband offset frequency value and a quadrature-phase (Q) baseband offset signal centered at the baseband offset frequency value;
    bandpass filtering the I baseband offset signal and Q baseband offset signal to produce an I bandpass signal and a Q bandpass signal, respectively; and
    downconverting the I bandpass signal and the Q bandpass signal from the baseband offset frequency to zero frequency to produce an I baseband receive signal and a Q baseband receive signal.

2. The method of claim 1, and further comprising low pass filtering the I baseband offset signal and the Q baseband offset signal prior to the bandpass filtering.

3. The method of claim 1, wherein bandpass filtering comprises filtering the I baseband offset signal and the Q baseband offset signal with bandpass filters whose pass band rejects second order inter-modulation interference centered around zero frequency.

4. The method of claim 1, wherein the I baseband offset signal and the Q baseband offset signal are analog signals, and further comprising amplifying the I baseband offset signal and the Q baseband offset signal using variable gain amplifiers and converting the I and Q baseband offset signals to digital I and Q baseband offset signals, respectively, and wherein bandpass filtering comprises bandpass filtering the digital I and Q baseband offset signals with digital bandpass filtering processes to produce I and Q digital bandpass signals, respectively.

5. The method of claim 4, wherein downconverting the I and Q bandpass signals comprises downconverting the I and Q digital bandpass signals with digital downconverting processes.

6. The method of claim 1, and further comprising setting the selected baseband offset frequency value to each of a plurality of values within a predetermined bandwidth, measuring noise in the I and Q baseband receive signals for each of the plurality of values of the baseband offset frequency, and selecting a value for the baseband offset frequency that produces lowest noise in the I and Q baseband receive signals.

7. The method of claim 6, and further comprising setting a value for a corner frequency for low pass filtering the I and Q baseband offset signals prior to said bandpass filtering, wherein the value for the corner frequency is based on the value of the selected baseband offset frequency value that produces the lowest noise.

8. An apparatus comprising:
    a controller configured to:
        select an initial value of a baseband offset frequency;
        measure an initial noise level of downconversion of a received wireless signal to the initial value of the baseband offset frequency;
        increment the initial value for the baseband offset frequency to select a new value of the baseband offset frequency;
        measure a new noise level of downconversion of the received wireless signal to the new value of the baseband offset frequency;
        select the initial value of the baseband offset frequency as a selected baseband offset frequency value if the initial noise level is lower than the new noise level;

select the new value of the baseband offset frequency as the selected baseband offset frequency if the new noise level is lower than the initial noise level;

a radio frequency (RF) mixer and demodulator that is configured to directly downconvert the received wireless signal to the selected baseband offset frequency value that is offset from zero frequency to produce an in-phase (I) baseband offset signal centered at the baseband offset frequency value and a quadrature-phase (Q) baseband offset signal centered at the baseband offset frequency value;

a bandpass filter configured to filter the I baseband offset signal and the Q baseband offset signal with a pass band centered at the baseband offset frequency to produce an I bandpass signal and a Q bandpass signal, respectively; and a baseband mixer that is configured to downconvert the I bandpass signal and the Q bandpass signal from the baseband offset frequency to zero frequency to produce an I baseband receive signal and a Q baseband receive signal.

9. The apparatus of claim 8, wherein the bandpass filter is configured to filter the I and Q baseband offset signals with a pass band that rejects second order inter-modulation interference centered around zero frequency.

10. The apparatus of claim 9, wherein the bandpass filter comprises a first bandpass filter that is configured to filter the I baseband offset signal to produce the I bandpass signal and a second bandpass filter that is configured to filter the Q baseband offset signal to produce the Q bandpass signal, and wherein the baseband mixer comprises a first baseband mixer that is configured to downconvert the I bandpass signal to zero frequency to produce the I baseband receive signal and a second baseband mixer that is configured to downconvert the Q bandpass signal to produce the Q baseband receive signal.

11. The apparatus of claim 8, wherein the controller is further configured to set the selected baseband offset frequency value to each of a plurality of values within a predetermined bandwidth, measure noise in the I and Q baseband receive signals for each of the plurality of values of the baseband offset frequency, and select a value for the baseband offset frequency that produces lowest noise in the I and Q baseband receive signals.

12. The apparatus of claim 11, and further comprising a first baseband low pass filter that is configured to low pass filter the I baseband offset signal to produce an I low pass filtered baseband offset signal prior to filtering by the bandpass filter and a second baseband low pass filter that is configured to filter the Q baseband offset signal to produce a Q low pass filtered baseband offset signal prior to filtering by the bandpass filter.

13. The apparatus of claim 12, wherein the controller is configured to set a value for a corner frequency for the first and second baseband low pass filters that is based on the selected value of the selected baseband offset frequency value that produces the lowest noise floor.

14. The apparatus of claim 12, and further comprising a variable gain amplifier configured to amplify the I low pass filtered baseband offset signal and the Q low pass filtered baseband offset signal and an analog-to-digital converter that is configured to convert the I low pass filtered baseband offset signal and Q low pass filtered baseband offset signal to digital I and Q low pass filtered baseband offset signals, respectively, and wherein the bandpass filter is a digital bandpass filter and the baseband mixer is a digital baseband mixer.

15. The apparatus of claim 11, wherein the controller is configured to supply the selected baseband offset frequency value to the bandpass filter and to the baseband mixer.

16. The apparatus of claim 11, and further comprising a local oscillator that supplies a local oscillator signal to the RF mixer and demodulator, and wherein the controller generates a frequency for the local oscillator signal that is based on the selected baseband offset frequency value.

17. A method comprising:
for each of a plurality of values for a baseband offset frequency:
directly downconverting a received wireless signal to the baseband offset frequency;
bandpass filtering the baseband offset signal with a bandpass filter having a pass band centered at the baseband offset frequency to produce a bandpass signal;
downconverting the bandpass signal from the baseband offset frequency to zero frequency to produce a baseband receive signal; and
measuring noise in the baseband receive signal;
incrementing the baseband offset frequency to a new one of the plurality of values; and
selecting one of the plurality of values for the baseband offset frequency that produces lowest noise in the baseband receive signal.

18. The method of claim 17, and further comprising configuring a radio frequency (RF) mixer to directly downconvert the received wireless signal from RF to the selected value for the baseband offset frequency.

19. The method of claim 17, and further comprising configuring a baseband mixer to downconvert the bandpass signal from the selected value for the baseband offset frequency to zero frequency.

20. The method of claim 17, and further comprising configuring a bandpass filter to bandpass filter the baseband offset signal centered at the selected value for the baseband offset frequency.

21. The method of claim 17, and further comprising configuring a value for a corner frequency for a baseband low pass filter that filters the baseband offset signal prior to said bandpass filtering based on the selected value for the baseband offset frequency.

22. Logic encoded in one or more tangible media for execution and when executed operable to:
for each of a plurality of values for a baseband offset frequency:
configure a radio receiver to downconvert a received radio frequency signal to the baseband offset frequency, and then to baseband after bandpass filtering at the baseband offset frequency to produce a baseband receive signal; and
measure noise in the baseband receive signal;
increment the baseband offset frequency to a new one of the plurality of values; and
select one of the plurality of values for the baseband offset frequency that results in lowest noise in the baseband receive signal.

23. The logic of claim 22, and further comprising logic that configures the radio receiver to operate with the selected value for the baseband offset frequency.

24. The logic of claim 23, and further comprising logic that configures a low pass filter in the radio receiver at a corner frequency that is based on the selected value for the baseband offset frequency.

25. The method of claim 6, wherein measuring noise in the I and Q baseband receive signals comprises measuring noise in the I and Q baseband receive signals at each of the plurality of values of the baseband offset frequency within a predetermined frequency bandwidth.

26. The method of claim 6, wherein measuring noise in the I and Q baseband receive signals comprises measuring noise by detecting a presence of power in frequency and time blocks of a transmission frame, wherein the presence of detected power in the frequency and time blocks of the transmission frame structure corresponds to noise in the I and Q baseband receive signals.

27. The apparatus of claim 13, wherein the controller is configured to measure noise in the I and Q baseband receive signals at each of a plurality of values of the baseband offset frequency within a predetermined frequency bandwidth.

28. The apparatus of claim 13, wherein the controller is configured to measure noise in the I and Q baseband receive signal by detecting a presence of power in frequency and time blocks of a transmission frame, wherein the presence of detected power in the frequency and time blocks of the transmission frame corresponds to the noise in the I and Q baseband receive signals.

* * * * *